United States Patent [19]

Mori et al.

[11] Patent Number: 4,793,939
[45] Date of Patent: Dec. 27, 1988

[54] LUBRICATING OIL COMPOSITION COMPRISING A POLYALKYLENE OXIDE ADDITIVE

[75] Inventors: Shigeo Mori, Kyoto; Chuzo Isoda; Satoshi Teshima, both of Uji, all of Japan

[73] Assignee: Dai-Ichi Kogyo Seiyaku Co., Ltd., Kyoto, Japan

[21] Appl. No.: 50,365

[22] Filed: May 18, 1987

[30] Foreign Application Priority Data

May 20, 1986 [JP]  Japan ................................ 61-117086

[51] Int. Cl.$^4$ ................. C10M 129/16; C10M 129/18
[52] U.S. Cl. ............................. 252/52 A; 252/51.5 R
[58] Field of Search .................... 252/52 A, 51.5 R

[56] References Cited

U.S. PATENT DOCUMENTS

| | | | |
|---|---|---|---|
| 2,522,155 | 9/1950 | Ballard et al. | 252/52 A |
| 2,819,278 | 1/1958 | De Groote et al. | 252/51.5 A |
| 4,245,004 | 1/1981 | Login et al. | 252/52 A |
| 4,302,349 | 11/1981 | Kosswig et al. | 252/52 A |

*Primary Examiner*—William R. Dixon, Jr.
*Assistant Examiner*—Jerry D. Johnson
*Attorney, Agent, or Firm*—Millen & White

[57] ABSTRACT

Properties of paraffinic or naphthenic mineral oil lubricants may be improved by admixing therewith a polyalkylene oxide compound having a $C_2$–$C_4$ alkylene oxide moiety and a $C_6$–$C_{40}$ alkylene oxide moiety.

8 Claims, No Drawings

LUBRICATING OIL COMPOSITION COMPRISING A POLYALKYLENE OXIDE ADDITIVE

BACKGROUND OF THE INVENTION

This invention relates to lubricating oil compositions containing a mineral base oil and an oil-soluble polyalkylene oxide compound.

Mineral oil lubricants, such as paraffinic or naphthenic petroleum oils, have been used for most lubricating purposes. However, they have certain disadvantages such as relatively low viscosity indices over varying temperatures and high susceptibility to oxidation.

Synthetic lubricating oils such as those of polyalkylene oxide type have been used as substitutes for mineral oil lubricants in certain area because of their relatively high viscosity indices in comparison with mineral oil lubricants.

Since both mineral oils and polyalkylene oxide oils have their own advantages, it would be desirable to combine them. However, most of the polyalkylene oxides such as polyethylene oxide, polypropylene oxide, copolymers of ethylene oxide and propylene oxide and their ethers or esters have limited solubilities in aliphatic hydrocarbons and thus cannot be mixed with paraffinic or naphthenic lubricating oil bases.

We have found that certain polymeric alkylene oxides containing long chain alkylene oxide moieties are substantially freely soluble in aliphatic hydrocarbon liquids and may be mixed with paraffinic or naphthenic lubricating oil bases to improve their properties such as viscosity indices, load-carrying capacities, anti-oxidative properties, wear resistances and the like.

SUMMARY OF THE INVENTION

According to this invention, there is provided a lubricating oil composition consisting essentially of a paraffinic or naphthenic mineral oil or a mixture of both types of mineral oils, and 5 to 60% by weight of the composition of a polyalkylene oxide compound of the formula:

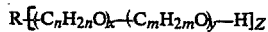

wherein

R is the residue of a compound having 1-8 active hydrogen atoms with removal of the active hydrogen atoms, n is 3-4, m is 6-40, x and y are an interger, and Z is 1-8; said polyalkylene oxide compound having a molecular weight of 500 to 100,000 and a $C_6$-$C_{40}$ alkylene oxide content of 15 to 60% by weight of the entire molecule.

DETAILED DISCUSSION

Some of polyalkylene oxide compounds of the above type are disclosed in, for example, U.S. Pat. No. 4,302,349 to Kosswig et al, and a co-pending U.S. patent application Ser. No. 409,262, filed Aug, 18, 1982 and assigned to the assignee of this application, now U.S. Pat. No. 4,711,734.

The polyalkylene oxide compounds may be prepared by reacting a starting active hydrogen compound $R(H)_Z$ in the presence of a basic or acidic catalyst first with a $C_2$-$C_4$ alkylene oxide and then with a $C_6$-$C_{40}$ alkylene oxide.

Examples of starting active hydrogen compounds include monoalcohols such as methanol, ethanol, butanol, lauryl alcohol, oleyl alcohol and stearyl alcohol; glycols such as ethylene glycol, propylene glycol and butylene glycol; polyols such as glycerine, trimethylolpropane, sorbitol and sucrose; phenols such as phenol, bisphenol A and hydroquinone; amines such as ammonia, ethylenediamine, triethylenediamine, n-butylamine, laurylamine, aniline and toluidine; carboxylic acids such as acetic acid, maleic acid and oleic acid.

Examples of $C_2$-$C_4$ alkylene oxides include ethylene oxide, propylene oxide and butylene oxide. Mixtures of these alkylene oxides may also be used. Propylene oxide alone is preferable.

Examples of usable $C_6$-$C_{40}$ alkylene oxides, namely epoxyalkanes include cyclohexene oxide, nonene oxide and alpha olefin oxides of 12-40 carbon atoms.

Usable basic or acidic catalyst include sodium hydroxide, potassium hydroxide, sodium acetate, sodium methoxide, boron tetrafluoride and phosphoric acid.

The proportions of $C_3$-$C_4$ alkylene oxide and $C_6$-$C_{40}$ alkylene oxide relative to the active hydrogen compound are selected so that the resulting adduct has a molecular weight of 500-100,000 and the $C_6$-$C_{40}$ alkylene oxide content of 15 to 60%, preferably 20 to 50% by weight of the entire molecule.

The reaction may be carried out at a temperature of 100° C. to 150° C. at a pressure below 5 kg/cm²G.

The resulting polyalkylene oxide adducts are substantially freely soluble in aliphatic hydrocarbon liquids such as paraffinic or naphthenic mineral oil bases. Heretofore, there have not been known polyalkylene oxides which are soluble in both aliphatic and aromatic hydrocarbon liquids while those soluble only in aromatic hydrocarbons are known.

Accordingly, the polyalkylene oxide compounds used in the present invention may be intermixed with a paraffinic or naphthenic or a mixture of both types of mineral oils at any proportion. However, the proportions of the polyalkylene oxide compounds ranging from 5 to 60%, preferably from 10 to 50% by weight of the composition have been found advantageous. Within this range, the polyalkylene compounds may improve properties of the base oils including viscosity indices, load-carrying capacities, anti-oxidative properties, wear resistances and the like while retaining inherent beneficial properties of the base oils.

The composition may contain conventional additives such as anti-oxidants, rust preventors and the like.

The following examples are given to illustrate the present invention. All parts and percents therein are by weight unless otherwise indicated.

EXAMPLE 1

An autoclave having stirring means was charged with 6 parts of propylene glycol and 5 parts of potassium hydroxide and then purged with nitrogen gas. 924 parts of propylene oxide were introduced to the autoclave at a pressure of 3 kg/cm²G and reacted at 130° C. Thereafter, 284 parts of nonene oxide were reacted at 130° C. Total reaction time was 4 hours.

After 20 parts of synthetic aluminum silicate powder were added, the reaction mixture was stirred at 120° C. for 3 hours and then filtered through a 1 micron mesh screen to remove aluminum silicate particles. 1284 parts of a liquid polyalkylene oxide compound were obtained. This polyalkylene oxide compound has a viscosity of 250 cps at 25° C., a nonene oxide content of 22%, and a molecular weight of 1284, and is freely soluble in liquid paraffin.

EXAMPLE 2

An autoclave having stirring means was charged with 550 parts of an adduct of 1 mole of nonylphenol and 7.5 moles of ethylene oxide, and 1 part of sodium hydroxide. After the interior was purged with nitrogen gas, the content of autoclave was heated to 150° C. Thereafter, 204 parts of alpha-olefin oxide of 16–18 carbon atoms were introduced at a pressure of 0.2 kg/cm²G and reacted for 3.5 hours. The sodium hydroxide catalyst was neutralized with acetic acid. 754 parts of a liquid polyalkylene oxide compound were obtained. This polyalkylene compound has a viscosity of 170 cps at 25° C., an alpha-olefin content of 27% and a moleclar weight of 754, and is freely soluble in liquid paraffin.

EXAMPLES 3–8

Analogous to Example 1, polyalkylene oxide compounds listed Table 1 below were prepared.

using Soda's four-balls tester at 220 rpm. The results are shown in Table 2.

TABLE 2

| Base Oil | Proportion of Polyalkylene Oxide of Ex. 1 | Viscosity (cts, 100° F.) Before Test | Viscosity (cts, 100° F.) After Test | Acid Number (mgKOH/g) Before Test | Acid Number (mgKOH/g) After Test | Degree of Tarring Before Test | Degree of Tarring After Test |
|---|---|---|---|---|---|---|---|
| Paraffinic | 0 | 32 | 42 | 0.10 | 1.2 | Yellow | Dark Brown |
|  | 20 | 37 | 38 | 0.10 | 0.7 | Yellow | Yellow |
| Naphthenic | 0 | 108 | 135 | 0.03 | 2.0 | Pale Brown | Black |
|  | 15 | 120 | 125 | 0.03 | 1.0 | Pale Brown | Pale Brown |
| SAE 30 | 0 | 85 | 115 | 0.05 | 0.7 | Yellow | Dark Brown |
|  | 10 | 100 | 103 | 0.05 | 0.2 | Yellow | Yellow |

As is apparent in Table 2, the polyalkylene oxide compound improved various properties of the base oils significantly.

We claim:

1. A lubricating oil composition consisting essentially of a paraffinic or naphthenic mineral oil or a mixture of both types of mineral oils, and 5 to 60% by weight of the composition of a polyalkylene oxide compound of the formula:

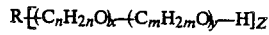

wherein

R is the residue of a compound having 1–8 active hydrogen atoms with removal of the active hydrogen atoms, n is 3–4, m is 6–40, x and y are an integer, and Z is 1–8;

said polyalkylene oxide compound having a molecular weight of 500 to 100,000 and a $C_6$–$C_{40}$ alkylene oxide content of 15 to 60% by weight of the entire molecule.

TABLE 1

| Example No. | Active Hydrogen Compound Name | Parts | KOH parts | $C_2$–$C_4$ Alkylene Oxide (parts) | $C_6$–$C_{40}$ Alkylene Oxide (parts) | Polyalkylene Oxide Compound $C_6$–$C_{40}$ Alkylene Oxide Content (%) | M.W. | Solubility in Liquid Paraffin |
|---|---|---|---|---|---|---|---|---|
| 3 | n-Butanol | 72 | 4.5 | PO, 978 | $C_{12}$–$C_{14}$ α-olefin oxide, 450 | 30 | 1500 | Soluble |
| 4 | Ethylene glycol | 62 | 3.0 | EO, 100 PO, 538 | Nonene oxide, 400 | 40 | 1000 | Soluble |
| 5 | Glycerine | 92 | 18.0 | EO, 900 PO, 2158 | $C_{12}$–$C_{14}$ α-olefin oxide, 1350 | 30 | 4500 | Soluble |
| 6 | Nonylphenol | 220 | 4.0 | PO, 905 | $C_{12}$–$C_{14}$ α-olefin oxide, 375 | 25 | 1500 | Soluble |
| 7 | Bisphenol A | 228 | 5.0 | PO, 1372 | $C_{16}$–$C_{18}$ α-olefin oxide, 400 | 20 | 2000 | Soluble |
| 8 | Propylene glycol | 76 | 5.0 | PO, 1424 | $C_{16}$–$C_{18}$ α-olefin oxide, 500 | 25 | 2000 | Soluble |
| Comp. 1 | n-Butanol | 72 | 4.5 | PO, 1428 | — | 0 | 1500 | Insoluble |
| Comp. 2 | Ethylene glycol | 62 | 3.0 | EO, 100 PO, 838 | — | 0 | 1000 | Insoluble |
| Comp. 3 | Nonylphenol | 220 | 4.0 | PO, 1280 | — | 0 | 1500 | Insoluble |

EO = Ethylene oxide; PO = Propylene oxide

EXAMPLE 9

The polyalkylene oxide compound prepared in Example 1 was incorporated into a paraffinic mineral oil (150 neutral), a naphthenic mineral oil (500 neutral) or a commercial motor oil (SAE 30) at a concentration shown in Table 2 below. The resulting compositions and control oils free of the polyalkylene oxide compound were subjected to a load-carrying capacity test 2. The lubricating oil composition of claim 1, wherein the $-(C_nH_{2n}O_x)-$ moiety is polyoxypropylene.

3. The lubricating oil composition of claim 1, wherein the $-(C_mH_{2m}O_y)-$ moiety is cyclohexene oxide, nonene oxide or a $C_{12}$–$C_{40}$ alpha-olefin oxide.

4. The lubricating oil composition of claim 1, wherein said $C_6$–$C_{40}$ alkylene oxide content is 20 to 50% by weight of the entire molecule of the polyalkylene oxide compound.

5. The lubricating oil composition of claim 1, wherein said compound having 1-8 active hydrogen atoms is an aliphatic monoalcohol, a glycol, a polyol, an amine, a phenol or a carboxylic acid; wherein the $-C_nH_{2n}O_x-$ moiety is polyoxypropylene; wherein the $-C_mH_{2m}O-$ moiety is cyclohexene oxide, nonene oxide or a $C_{12}$-$C_{40}$ alpha-olefin oxide; and wherein said $C_6$-$C_{40}$ alkylene oxide content is 20 to 50% by weight of the entire molecule of the polyalkylene oxide compound.

6. The lubricating oil composition of claim 1, wherein R is the residue of n-butanol, ethylene glycol, propylene glycol, glycerine, nonylphenol or bisphenol A.

7. The lubricating oil composition of claim 5, wherein R is the residue of n-butanol, ethylene glycol, propylene glycol, glycerine, nonylphenol or bisphenol A.

8. A lubricating oil composition consisting essentially of a paraffinic or naphthenic mineral oil or a mixture of both types of mineral oils, and 10 to 60% by weight of the composition of a polyalkylene oxide compound of the formula:

$$R-[(C_nH_{2n}O)_x-(C_mH_{2m}O)_y-H]_Z$$

wherein
R is the residue of an aliphatic monoalcohol, a glycol, a polyol, an amine, a phenol or a carboxylic acid having 1-8 active hydrogen atoms with removal of the active hydrogen atoms,
n is 3-4,
m is 6-40,
x and y are an integer, and
z is 1-8;
said polyalkylene oxide compound having a molecular weight of 500 to 100,000 and a $C_6$-$C_{40}$ alkylene oxide content of 20 to 50% by weight of the entire molecule.

* * * * *